US009644652B2

(12) United States Patent
Hertweck et al.

(10) Patent No.: US 9,644,652 B2
(45) Date of Patent: May 9, 2017

(54) CONNECTING ELEMENT AND METHOD FOR PRODUCING THE LATTER

(75) Inventors: Theo Hertweck, Baden-Baden (DE); Martin Waibel, Gaggenau (DE); Andreas Leier, Gaggenau (DE)

(73) Assignee: Protektorwerk Florenz Maisch GmbH & Co. KG, Gaggenau (DE)

( * ) Notice: Subject to any disclaimer, the term of this patent is extended or adjusted under 35 U.S.C. 154(b) by 450 days.

(21) Appl. No.: 14/007,837

(22) PCT Filed: Mar. 27, 2012

(86) PCT No.: PCT/EP2012/055405
§ 371 (c)(1),
(2), (4) Date: Dec. 9, 2013

(87) PCT Pub. No.: WO2012/130840
PCT Pub. Date: Oct. 4, 2012

(65) Prior Publication Data
US 2014/0112711 A1  Apr. 24, 2014

(30) Foreign Application Priority Data

Mar. 29, 2011  (DE) .................. 10 2011 015 435

(51) Int. Cl.
*F16B 7/04* (2006.01)
*E04B 1/58* (2006.01)
(Continued)

(52) U.S. Cl.
CPC .................. *F16B 1/00* (2013.01); *E04B 9/10* (2013.01); *E04B 9/127* (2013.01); *F16B 7/0413* (2013.01);
(Continued)

(58) Field of Classification Search
CPC .......... E04B 1/5818; E04B 9/10; E04B 9/127; F16B 1/00; F16B 7/0413; F16B 7/042;
(Continued)

(56) References Cited

U.S. PATENT DOCUMENTS 6,434,903 B1 *  8/2002  Hertweck ............ E04B 9/0478
411/85
7,618,210 B2 * 11/2009  Wagner ............... E04F 11/1836
403/306
8,485,835 B2 *  7/2013  Liang .................... E04B 9/068
439/110

FOREIGN PATENT DOCUMENTS

DE  2 109 117   9/1972
DE  86 29 047   1/1987
(Continued)

OTHER PUBLICATIONS

German Search Report for German Application No. 10 2011 015 435.3 (Jun. 16, 2011).
(Continued)

*Primary Examiner* — Josh Skroupa
(74) *Attorney, Agent, or Firm* — Mintz Levin Cohn Ferris Glovsky and Popeo, P.C.; Peter F. Corless; Steven M. Jensen (57) ABSTRACT

A connecting element for connecting profile rails and/or profiles of various shape comprises a planar base part which comprises a central web and two lateral limbs which are angled with respect to the web. At least one of the limbs comprises a base part surface section slung out from the web.

16 Claims, 6 Drawing Sheets

(51) Int. Cl.
*F16B 1/00* (2006.01)
*E04B 9/10* (2006.01)
*E04B 9/12* (2006.01)

(52) U.S. Cl.
CPC .......... *F16B 7/0446* (2013.01); *E04B 1/5818* (2013.01); *Y10T 29/49* (2015.01); *Y10T 403/55* (2015.01); *Y10T 403/557* (2015.01); *Y10T 403/7098* (2015.01)

(58) Field of Classification Search
CPC ........ F16B 7/22; F16B 7/0466; Y10T 403/55; Y10T 403/557; Y10T 403/7098; Y10T 29/49
USPC ............................ 403/292, 297, 383; 29/592
See application file for complete search history.

(56) References Cited

FOREIGN PATENT DOCUMENTS

| | | | |
|---|---|---|---|
| DE | 94 01 416 | 3/1994 | |
| DE | 9401415 U1 * | 3/1994 | ............ E04B 9/127 |
| DE | 43 22 631 | 1/1995 | |
| DE | 297 17 460 | 11/1997 | |
| DE | 298 05 591 | 6/1998 | |
| DE | 199 14 638 | 11/2000 | |
| DE | 199 20 489 | 11/2000 | |
| DE | 102 49 783 | 1/2004 | |
| DE | 20 2007 008901 | 8/2007 | |
| FR | 2856444 A1 * | 12/2004 | ............ E04B 9/065 |
| FR | 2900219 A1 * | 10/2007 | ............... E04B 9/10 |

OTHER PUBLICATIONS

International Search Report for International Application No. PCT/EP2012/005405 (Jun. 25, 2012).

\* cited by examiner

CONNECTING ELEMENT AND METHOD FOR PRODUCING THE LATTER

CROSS-REFERENCE TO RELATED APPLICATIONS

This application is a National Phase application filed under 35 USC 371 of PCT International Application No. PCT/EP2012/055405 with an International Filing Date of Mar. 27, 2012, which claims under 35 U.S.C. §119(a) the benefit of German Application No. 10 2011 015 435.3, filed Mar. 29, 2011, the entire contents of which are incorporated herein by reference.

The present invention relates to a connection element for connecting section rails and/or sections of different shapes, having a planar base part which comprises a central web and two lateral limbs angled with respect to the web.

Such connection elements serve, for example, to connect two section rails, in particular carrier rails for suspended ceilings, to one another in a longitudinal or transverse direction or to connect a section rail to a holder, for example to a wall connector or to another transverse section. The cross-sectional shape of the connection element can be adapted to a specific type of section rail so that the connection element can be plugged into the section rail and can optionally be clamped therein. Connection elements of the named kind can in particular have a U-shaped or H-shaped cross-section, with a planar layer of a starting material being bent to shape during manufacture. A planar manner of construction of the base element makes a simple and inexpensive production possible. A common construction shape of a connection element of the named kind provides that the two limbs are bent over relative to a planar web along a respective bend edge.

There is a need to cut the material requirement and the weight in connection elements of the above-named kind.

This is achieved by a connection element having the features of claim 1.

In accordance with the invention, at least one of the limbs comprises an areal piece of the base part folded out of the web. In other words, the limb is formed at least partly by an areal piece which originally, that is with respect to the starting material, belonged to the web and only became a part of one of the limbs by folding out. The use of material can be cut in this manner since, in the finished connection element, the web has a free space in which the folded-out areal piece was originally located. The weight and the manufacturing costs of the connection element can thus be cut. It was found in accordance with the invention that the stability of the web is sufficient, despite the free space, to ensure a reliable connection of section rails. In addition, unwanted waste, which would arise in the case of a subsequent cutting of an areal piece out of a web, is avoided by the provision of a folded-out areal piece.

Further developments of the invention are set forth in the dependent claims, in the description and in the enclosed drawings.

Each of the two limbs preferably comprises an areal piece of the base part folded out of the web. The material saving can thereby be further increased.

The areal piece can be folded out of the web along a separation line, in particular a U-shaped separation line, not extending up to the margin of the base part. The separation line therefore defines an incision in the web. The extent of the separation line predefines the shape of the folded-out areal piece. Each of the two limbs can in particular comprise an areal piece of the base part which is folded out of the web along a U-shaped separation line. In this respect, the limbs of the U-shaped separation lines preferably face away from one another. The two folded-out areal pieces of the connection element thus have U-shaped outer edges, whereas the web is formed in H shape overall.

In accordance with an embodiment of the invention, the limb is formed by a bent-over marginal strip of the base part and by the folded-out areal piece adjoining the bent-over marginal strip. The folded-out areal piece is connected to the web via the marginal strip. The marginal strip is, for example, therefore bent over relative to the web for folding out the areal piece, with the areal piece which is pivoted with the marginal strip on the bending over being able to left unchanged relative to the marginal strip or being able to be additionally bent over.

The marginal strip can in particular be bent over by approximately 90° with respect to the web. The marginal strip can thereby form a part of an angled limb and the connection element can serve for connecting common U-shaped section rails or, for example, hollow sections. The marginal strip can, however, also be bent over by a different angular amount with respect to the web if the section rails to be connected have a corresponding kink. I.e. the extent of the bending over and its shape can depend on the section rails to be connected.

Furthermore, the bent over marginal strip and the folded-out areal piece can together form a straight, substantially planar surface. This allows a particularly simple manufacture since no additional workstep is required to bend over the marginal strip relative to the folded-out areal piece.

The bent over marginal strip is preferably narrower than the folded out areal piece. Since the material saving with respect to a conventionally shaped section is substantially provided by the size of the folded-out areal piece, a particularly pronounced reduction in the manufacturing costs is possible with this embodiment.

In accordance with a further embodiment of the invention, the web comprises a longitudinal strip, preferably a central longitudinal strip, and two transverse strips adjoining it at the end face, with the transverse strips being connected to the limbs. Respective material-free regions at which the folded-out areal piece had previously been located extend between the two transverse strips at both sides of the longitudinal strip along a longitudinal axis of the connection element.

In accordance with a further embodiment of the invention, the limbs are curved to facilitate a clamping or clawing of the connection element in the associated section rail. The curvature can in this respect preferably extend, viewed from the outside, concavely from the web to the free end of the respective limb. The limbs can generally also extend straight, i.e. without a curve, in order e.g. to achieve a better adaptation to section rails to be connected having limb regions likewise extending without a curve.

The base part preferably comprises metal, in particular sheet metal, or plastic. This allows a particularly simple and inexpensive manufacture. The base part can generally also comprise plastic.

The base part, in particular the web, can furthermore comprise at least one reinforcement bead. The stability of the connection element can be increased in this manner.

The invention further relates to a method of manufacturing a connection element for connecting section rails and/or sections of different shapes, in which a planar base part is provided and is shaped to form a section element having a central web and two lateral limbs angled with respect to the web.

In accordance with the invention, the base part is cut into along a separation line and an areal piece of the base piece is folded out of the plane of the base part along the separation line such that it forms at least a part of one of the limbs. The base part provided can in particular be a planar, areal layer of a starting material such as a sheet metal layer. While conventionally outer marginal portions of the base part are angled to form limbs, for which purpose corresponding material regions then also have to be provided in advance, in accordance with the invention a part of the limbs is bent out of the inner region of the starting layer and later forms the web. This is made possible by the incision which, on the one hand, allows a removal of starting material from the interior of the starting layer and, on the other hand, provides that a residual connection is maintained between the web and the limbs.

A marginal strip of the base part in the region of two connection portions adjoining the separation line is preferably bent over, in particular by approximately 90°, on the folding out of the areal piece. The bending over takes place along two bending edges which each extend from one end of the separation line to a margin of the base part. Due to the previously made incision, the middle areal piece is automatically folded out of the plane of the web on the bending over of the marginal strip along the two bending edges— which are preferably relatively short. The layer of the starting material to be provided for the base part can be made narrower in accordance with the invention in comparison with a known connection material having laterally bent over limbs. In detail, only the regions have to be provided for the—preferably relatively narrow—marginal strips as additions with respect to the web surface.

The limbs can additionally be bent to form an arch to facilitate a clamping or clawing of the connection element into an associated section rail. The bending to form an arch can, however, be made dependent on the cross-sectional shape of the section rails to be connected.

Furthermore, at least one reinforcement bead can be shaped into the base part, in particular into the web, to increase the stability of the connection element.

The invention will be described in the following by way of example with reference to the drawings.

Figure 1:
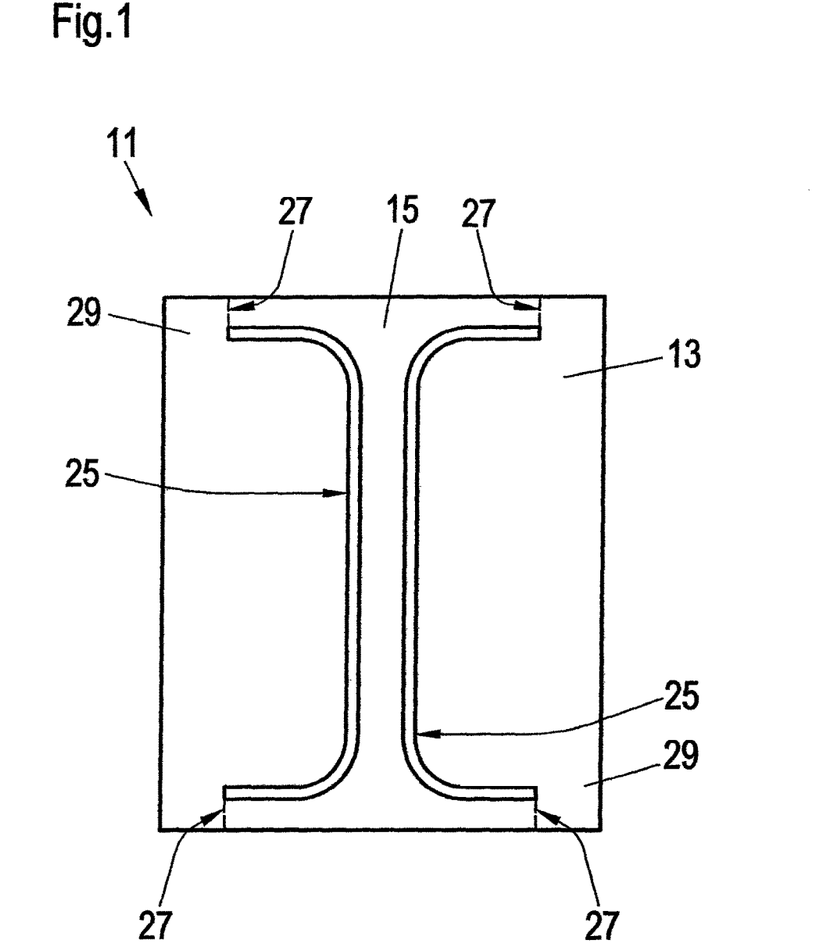
FIG. 1 shows a base part of a connection element in accordance with the invention before the folding out of areal pieces.
Figure 2:
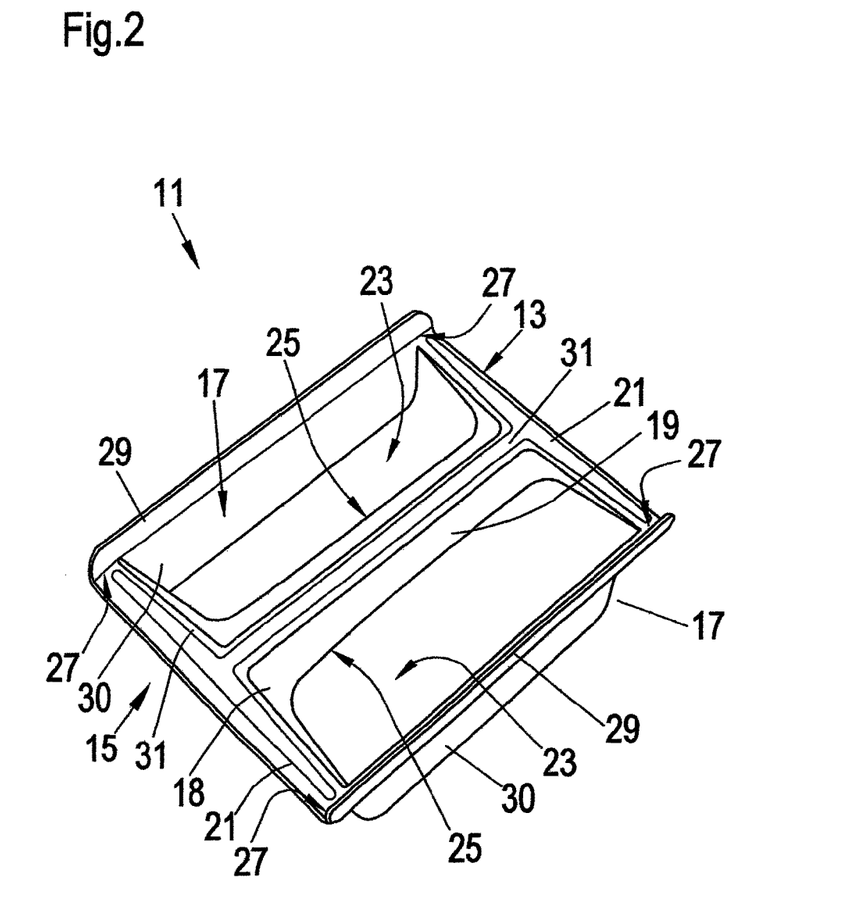
FIG. 2 is a perspective representation of a connection element in accordance with an embodiment of the invention.
Figure 3:
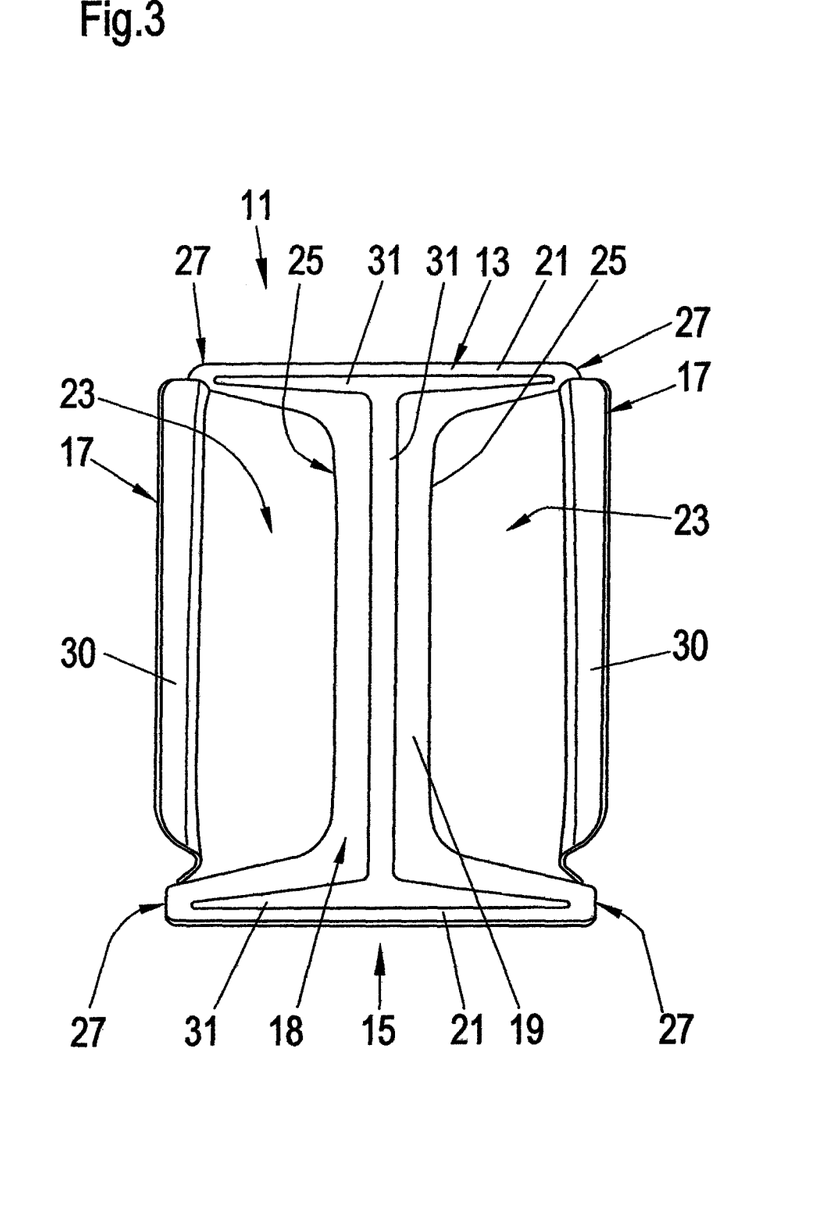
FIG. 3 shows a plan view of the connection element in accordance with FIG. 2.

In accordance with FIG. 1, a connection element 11 is shaped from an areal sheet metal layer, which forms a base part 13 of the connection element 11, for the longitudinal connection of section rails. In the completed state, the base part 13 in accordance with FIGS. 2 and 3 comprises a central, substantially planar web 15, and two limbs 17 projecting therefrom at the marginal side. The web 15 is composed of an H-shaped support region 18 and two material-free regions 23, with the support region 18 comprising a longitudinal strip 19 as well as two transverse strips 21 adjoining it at the end face. The transition between the support region 18 and the material-free regions 23 is defined by two U-shaped separation lines 25 which are produced on the manufacture of the connection element 11 by cutting into the base part 13.

Respective bending edges 27 extend from the ends of each separation line 25 up to the margin of the base part 13. Respective marginal strips 29 of the base part 13 are bent over by approximately 90° with respect to the plane of the web 15 along these bending edges 27. Due to the provided separation lines 25, a respective areal piece 30 of the base part 13 is folded out of the web 15—downwardly in FIG. 1—on the bending over of the marginal strips 29—upwardly in FIG. 2. Each limb 17 is thus formed by a marginal strip 29 and by a folded-out areal piece 30, with in each case the marginal strip 29 and the folded-out areal piece 30 extending in opposite directions away from the web 15. The bent over marginal strip 29 and the folded-out areal piece 30 in this respect each together form a straight, substantially planar surface by which the limb 17 is defined. The limbs 17 are connected to the web 15 at the bending edges 27, i.e. each marginal strip 29 is connected to end portions of the two transverse strips 21. Only the areal pieces to be folded over could generally also be bent over with respect to the web, while the marginal strips remain in their original position, i.e. are not bent over. The bending lines would in this case extend respectively between the free ends of the U-shaped separation lines and connect them.

On the manufacture of the connection element 11, an areal, planar sheet metal layer is first provided as a base part 13, as is shown in FIG. 1. This base part 13 is cut into along the two separation lines 25 so that corresponding slits are formed. Subsequently, the two marginal strips 29 are bent upward by 90° along the bending edges 27, with simultaneously the areal pieces 30 being folded downwardly out of the plane of the web 15 so that they form an angled limb 17 of the connection element 11 together with the marginal strip 29. Due to the material-free regions 23 which result therefrom, weight and material costs can be saved.

Figure 4:
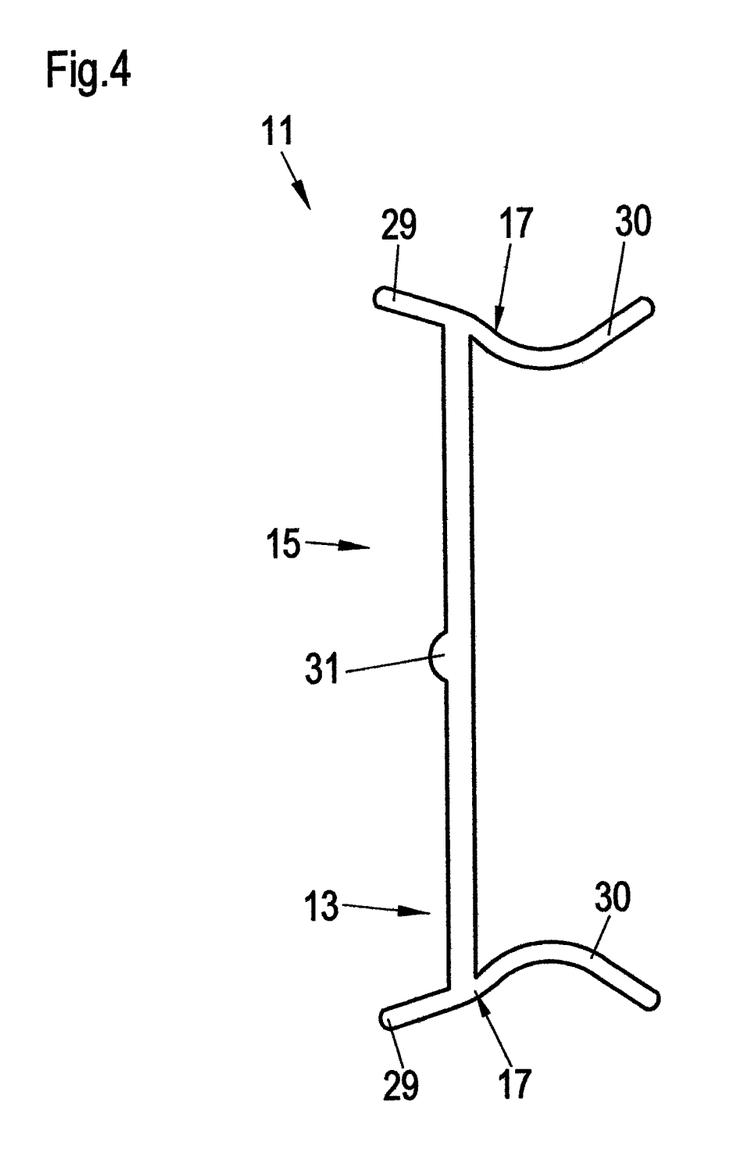
FIG. 4 shows a side view of the connection element in accordance with FIG. 2.

As can in particular be seen from FIG. 4, the marginal strips 29 are formed relatively narrow in comparison with the folded-out areal pieces 30 since the achievable material saving is substantially produced by the size of the folded-out areal pieces 30. The width of the marginal strip 29 can be selected with respect to the stability demands given by the respective use. As can likewise be seen from FIG. 4, the folded-out areal pieces 30 are inwardly arched in order thus further to increase the stability and optionally to support a wedging of the connection element 11 in an associated section rail due to the provided spring effect. For a further increase in stability, reinforcement beads 31 are shaped into the base part 13 and extend along the longitudinal strip 19 as well as along the two transverse strips 21 of the web 15.

Figure 5:
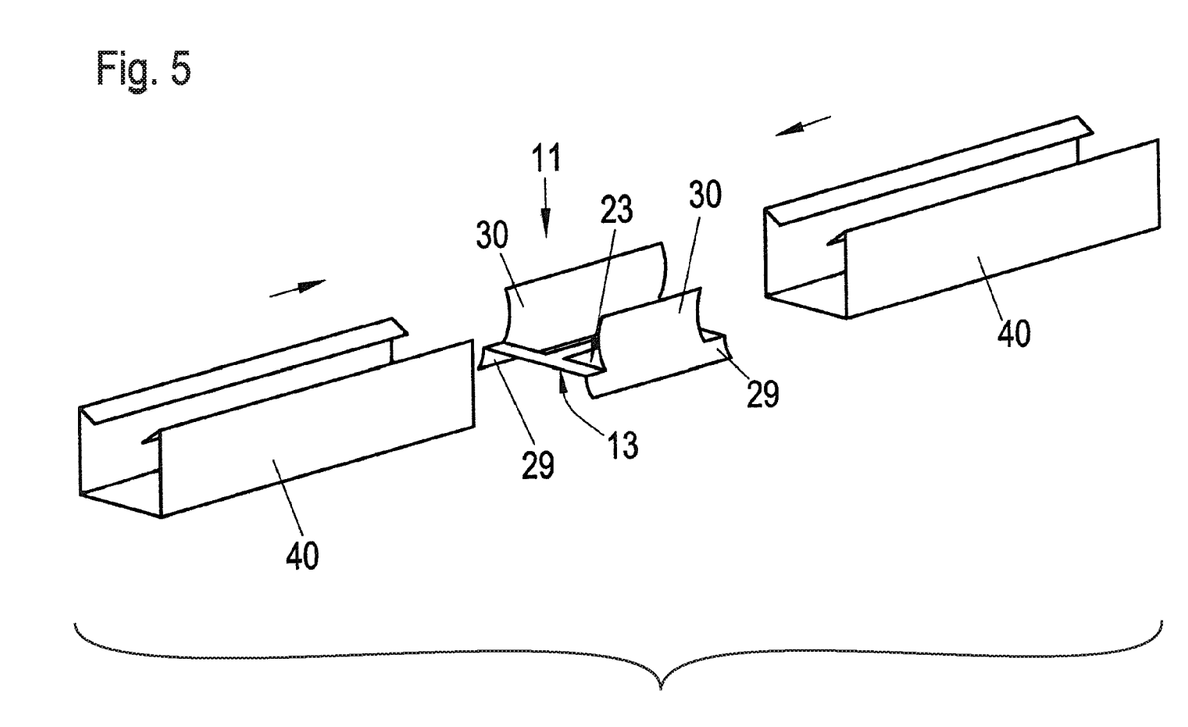
FIG. 5 illustrates the longitudinal connection of two section rails by means of a connection element which is designed in accordance with an embodiment of the invention.

The principle of longitudinal connection of two section rails 40 is illustrated in FIG. 5, with the section rails 40 being shown shortened for simplification. A connection element 11 as previously described is inserted—as illustrated by the arrows—by half in each case into the two section rails 40 and clamps therein so that the two section rails 40 are fixedly connected to one another in the longitudinal direction.

Figure 6:
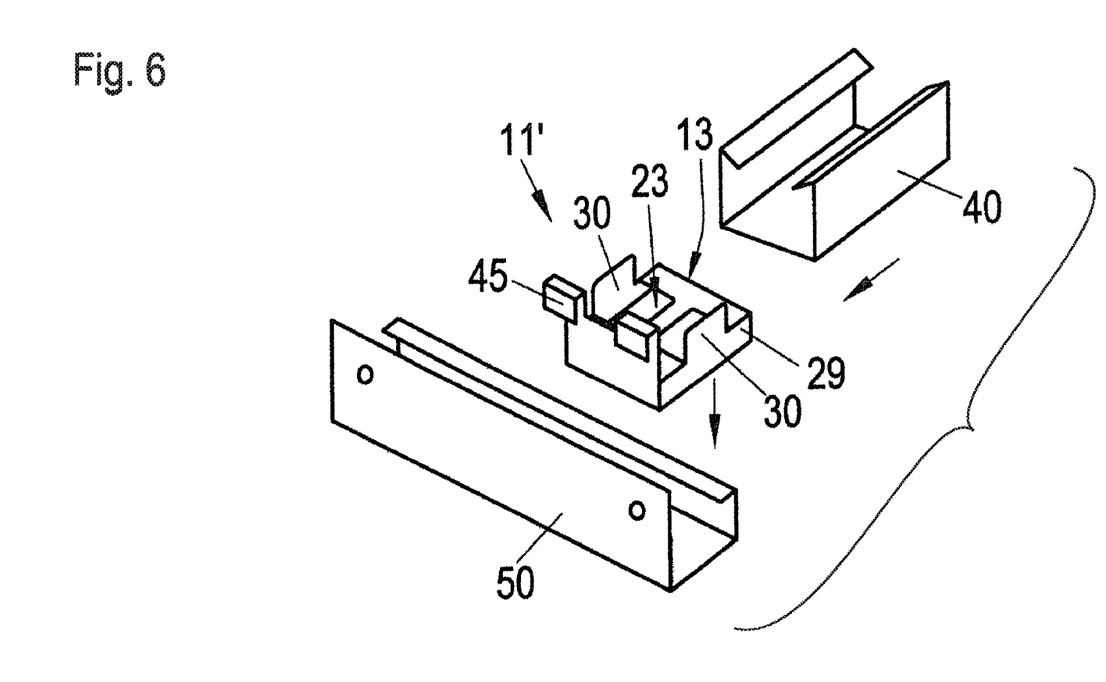
FIG. 6 illustrates the connection of a section rail to a holder by means of a connection element which is designed in accordance with an alternative embodiment of the invention.

Alternatively, in accordance with FIG. 6, a connection element 11' can be provided at whose one end a fastening means 45 is provided. The folded-out areal pieces 30 are inserted completely into a single section rail 40 in this embodiment, whereas the connection element 11' is attached to a holder 50 in a transverse direction by means of the fastening means 45. The holder 50 can in turn be fastened to a wall so that the connection element 11' serves for the wall connection of the section rail 40. The holder 50 can, for example, also be formed as a transverse section instead of as a wall connection.

REFERENCE NUMERAL LIST 11 connection element
13 base part
15 web
17 limb
18 support region
19 longitudinal strip
21 transverse strip
23 material-free region
25 separation line
27 bending edge
29 marginal strip
30 folded-out areal piece
31 reinforcement bead
40 section rail
45 fastening means
50 holder/transverse section

The invention claimed is:

1. A connection element for connecting section rails and/or sections of different shapes, comprising:
   a planar base part defined by a central web with material-free regions formed in the web; and
   two lateral limbs angled with respect to the web, wherein the two lateral limbs comprise areal pieces folded out of the web so as to produce and arrange the material-free regions of the web between the two lateral limbs.

2. The connection element in accordance with claim 1, wherein the areal piece is folded out of the web along a separation line not extending up to the margin of the base part.

3. The connection element in accordance with claim 2, wherein the separation line is a U-shaped separation line.

4. The connection element in accordance with claim 1, wherein the limb is formed by a bent over marginal strip of the base part and by the folded-out areal piece adjoining the bent over marginal strip.

5. The connection element in accordance with claim 1, wherein the web comprises a longitudinal strip and two transverse strips adjoining end faces of the longitudinal strip, the transverse strips being connected to the limbs, respectively.

6. The connection element in accordance with claim 5, wherein the longitudinal strip is a central longitudinal strip.

7. The connection element in accordance with claim 1, wherein the limbs are curved.

8. The connection element in accordance with claim 1, wherein the base part comprises metal or plastic.

9. The connection element in accordance with claim 8, wherein the metal comprises sheet metal.

10. The connection element in accordance with claim 1, wherein the base part comprises at least one reinforcement bead.

11. The connection element in accordance with claim 1, wherein the web comprises at least one reinforcement bead.

12. A method of manufacturing a connection element for connecting section rails and/or sections of different shapes, comprising the steps of:
   providing a planar base part defined by a central web with material-free regions formed in the web;
   shaping the base part to form a section element having the central web and two lateral limbs angled with respect to the web, wherein the two lateral limbs comprise areal pieces;
   cutting into the base part along a separation line; and
   folding the areal pieces out of the plane of the base part along the separation line so as to form at least a part of the limbs and producing and arranging the material-free regions of the web between the two lateral limbs.

13. The method in accordance with claim 12, wherein a marginal strip of the base part is bent over in the region of two connection portions adjoining the separation line on the folding out of the areal piece.

14. The method in accordance with claim 12, wherein the limb is bent to form an arch.

15. The method in accordance with claim 12, wherein at least one reinforcement bead is shaped into the base part.

16. The method in accordance with claim 12, wherein at least one reinforcement bead is shaped into the web.

* * * * *